(12) United States Patent
Hall

(10) Patent No.: US 6,878,416 B2
(45) Date of Patent: Apr. 12, 2005

(54) PIEZOELECTRIC COATING

(75) Inventor: Jeffrey Daniel Hall, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/388,892

(22) Filed: Mar. 14, 2003

(65) Prior Publication Data

US 2004/0180133 A1 Sep. 16, 2004

(51) Int. Cl.⁷ .......................... B05D 5/12; C23C 14/00
(52) U.S. Cl. ................... 427/532; 427/100; 427/126.3; 204/192.17; 204/192.18
(58) Field of Search .................. 204/192.17, 192.18; 427/126.3, 100, 532, 551, 553, 558, 557

(56) References Cited

U.S. PATENT DOCUMENTS 3,787,609 A * 1/1974 Plumeau ...................... 348/284
4,630,040 A * 12/1986 Haertling ...................... 345/48
6,373,618 B1 * 4/2002 Agrawal et al. ............. 359/265

OTHER PUBLICATIONS

Jonathan R. Tuck & J M. Hale; A Novel Thick-Film Strain Transducer Using Piezoelectric Paint; Department of Mechanical, Materials & Manufacturing Engineering: University of Newcastle.

* cited by examiner

Primary Examiner—Brian K. Talbot

(57) ABSTRACT

A color shifting composition and method useful as a coating on a surface. The composition comprises a layer of piezoelectric material disposed on the surface and a layer of electrically conductive disposed on the layer of piezoelectric material. A mechanism is included for changing an electromagnetic property of the layer of piezoelectric material. Thus, the surface has a first reflective or refractive property at one setting of the mechanism and another reflective or refractive property at another setting of the mechanism. In the illustrative embodiment, the layer of piezoelectric material and the layer of electrically conductive material are sufficiently thin to be transparent to electromagnetic energy in the frequencies of interest. In the illustrative embodiment, the mechanism for changing an electromagnetic property of the layer of piezoelectric material is a source of the electrical potential.

9 Claims, 1 Drawing Sheet

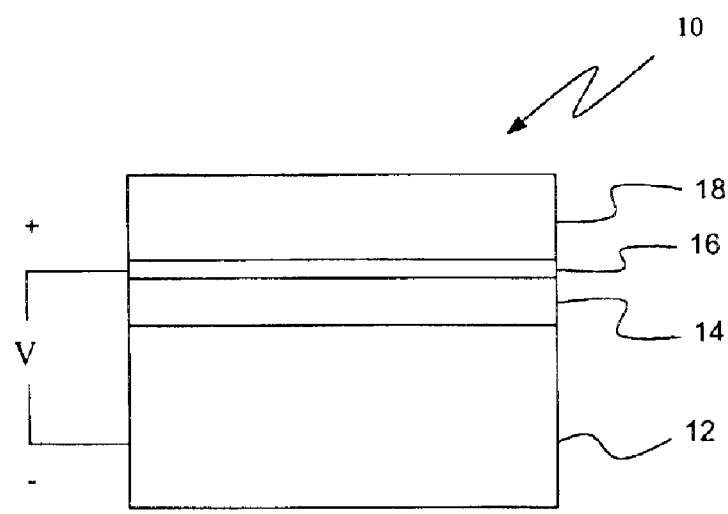

PIEZOELECTRIC COATING

BACKGROUND OF THE INVENTION

1. Field of Invention

The present invention relates to coatings. More specifically, the present invention relates to color varying or color shifting coatings.

2. Description of the Related Art

Paint is a coating applied to a variety of surfaces for a number of diverse applications. Automobiles, sports utility vehicles, trucks and other vehicles constitute a major typical application of paint for aesthetic and utilitarian purposes. Typically, after the vehicle has been painted, the color remains fixed until the vehicle is repainted. This requires the consumer to make a decision at the time of purchase as to the color of the vehicle and to live with this choice for so long as the consumer owns the vehicle. This leads to a difficult decision-making process by which some consumers agonize for some time over the choice of color for their new vehicle. In many cases, the consumer experiences buyer's remorse to the extent that the consumer second-guesses his or her choice of color for the vehicle.

Further, the resale value of the vehicle is often limited by its color. Consequently, the consumer may be forced to choose between a first color of preference and a second color for optimal resale value. From another perspective, the would-be buyer of the previously owned vehicle must either limit his or her options to a smaller number of vehicles of a desired color or factor into the buying decision the cost of repainting a vehicle of a less desired color. Thus, color issues limit the resale market.

Further, those skilled in the art will appreciate that limitations on the resale market operate as limitations on the vehicle market generally inasmuch as a would-be buyer's willingness and ability to purchase a new vehicle is often connected to his or her ability to sell a currently owned vehicle at a highest possible price.

Inasmuch as it is currently costly and time-consuming to repaint a vehicle, a need exists in the art for a system or method for changing the color of the vehicle without repainting the vehicle.

Currently, to the extent that color shifting paints or coatings are used, these coatings generally involve the use of metal flakes which appear to provide a coating of different colors at different viewing angles. However, these coatings are generally angle dependent and do not provide color shifting with respect to the entire coated surface given the angle dependency thereof.

Accordingly, a need remains in the art for an angle independent system or method for changing the color of a coated surface.

SUMMARY OF THE INVENTION

The need in the art is addressed by the color shifting system and method of the present invention. The system is a composition useful as a coating on a surface and comprises a layer of piezoelectric material disposed on the surface and a layer of electrically conductive material disposed on the layer of piezoelectric material. A mechanism is included for changing an electromagnetic property of the layer of piezoelectric material. Thus, the surface has a first reflective or refractive property at one setting and another reflective or refractive property at another setting of the mechanism.

The inventive method for providing a color shifting composition useful as a coating on a surface thus includes the steps of: disposing a layer of piezoelectric material on the surface; disposing a layer of electrically conductive material on the layer of piezoelectric material; and changing an electromagnetic property of the layer of piezoelectric material, whereby the surface has a first reflective or refractive property at one value and has another reflective or refractive property at another value of the electromagnetic property changed.

BRIEF DESCRIPTION OF THE DRAWINGS

The FIGURE shows a cross-sectional view of an embodiment of the invention in which a surface has piezoelectric coating applied in accordance with the teachings of the present invention.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The FIGURE shows a cross-sectional view of an embodiment of the invention in which a surface has piezoelectric coating applied in accordance with the teachings of the present invention. As shown in the FIGURE, and in accordance with the teachings of the present invention, the arrangement 10 includes a piezoelectric material layer 14 that is applied on a base metal surface (or a conductive layer on a non-metallic surface) to be painted 12. Piezoelectric material for the layer 14 may be any of one of the following materials PZT, PLZT, or PNZT (or any other ferroelectric or piezoelectric material for example $BaTiO_3$, $SrTiO_3$, $LiNbO_3$, $KnbO_3$, $LiTaO_3$, $PBTa_2O_5$, etc.) and may be purchased commercially from a company such as PZT. (See www.piezo.com.) As will be appreciated by one of ordinary skill in the art, the piezoelectric material may be chosen based on such considerations as electrode thickness, piezoelectric thickness, piezoelectric type, piezoelectric orientation, and material doping (to change the ferroelectric properties).

The piezoelectric material layer 14 is sandwiched between an ultra-thin metallic electrode 16 and the base conductive surface 12. In accordance with the present teachings, the electrode layer 16 is designed to be kept thin so as to remain transparent to electromagnetic energy in the range of interest, i.e. 10–100 nanometers to remain transparent to visible light in the illustrative application. An optional protective layer 18 is provided over the ultra-thin metallic electrode layer 16.

In the illustrative embodiment, the thickness of the piezoelectric layer 14 is in the range of 2–5 microns for a piezoelectric material of PZT. These design specifications are believed to be optimal for use with an electrode layer 16 made of such metals and metal oxides as aluminum (Al), titanium (Ti), platinum (PT), indium tin oxide (ITO) and gold (Au) having a thickness of the 10–100 nm. The electrode layer 16 may be made thicker (e.g. 200–300 nm) on the bottom surface to allow more uniformity, better adhesion, and a smoother surface.

Ideally, the piezoelectric layer 14 is a directional, preferably single crystal, layer.

It should be noted that the present invention is not limited to a change of color of a coated surface with respect to visible light. That is, the invention is not limited to use with visible energy. The present teachings may be extended to infrared and ultraviolet energy without departing from the scope of the present teachings.

Those skilled in the art may use the present teachings to coat surfaces to achieve a change of color at other frequencies of energy in the electromagnetic spectrum without departing from the scope of the present teachings.

Any of a number of techniques known in the art for applying the piezoelectric layer 14 onto the surface 12 with a broad range of thicknesses may be used such as sol-gel or sputter deposition. The electrode layer 16 could be deposited using a number of conventional techniques as well, such as sputter deposition using titanium, aluminum or platinum, all of which have been shown to work safely with piezoelectric ceramics.

The piezoelectric material and its thickness will determine what color an object will be. By changing the thickness of the piezoelectric layer 14, one can change how the light reflects and refracts off of the base metal or conductive layer 12 and the upper metal electrode layer 16. A simple DC (direct current) voltage applied positive or negative to the layer 14 in the range from the 0 to 2000 volts should be sufficient to effect a change in thickness of the layer 14. The color would be directly proportional to the voltage applied to the piezoelectric material 14. The equation below provides a relationship between applied voltage, thickness, material and resulting color: $\Delta T = V^* d_{33}$, where T is thickness, V is voltage and d is a piezoelectric property for a material where the voltage is applied in the 3 direction and movement/strain of interest is also in the 3 direction.

Thus, in accordance with the present teachings, a voltage is applied across the two electrodes 12 and 16 by a source 20, to the piezoelectric layer 14 to effect a change in the thickness thereof in accordance with the equation above. DC voltage generators are fairly inexpensive and abundant for use on devices such as the system 10 of the present invention. For automotive applications, AC and DC electrical systems are available which operate at high and low voltage and current levels. The additional cost of circuitry to implement the teachings of the present invention should be insignificant.

An AC voltage or current with or without a DC bias may be used to cause the color to shift rapidly or fluctuate. A change in the doping of the piezoelectric material can also change the base color of the system 10. In the illustrative embodiment, lead-zirconate-titanate was chosen as a piezoelectric material as this material can be easily doped with elements such as lanthanum and niobium. Candidate metals and metal oxides for electrodes, include aluminum (Al), titanium (Ti), platinum (PT), indium tin oxide (ITO) and gold (Au). Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method for color shifting a surface comprising the steps of:
   coating a layer of piezoelectric material on said surface;
   coating a layer of electrically conductive material on said layer of piezoelectric material; and
   applying energy to change an electromagnetic property of said layer of piezoelectric material whereby said surface has a first reflective property at one setting and another reflective property at another setting.

2. The invention of claim 1 wherein said step of applying energy to change an electromagnetic property of said layer of piezoelectric material includes the step of coupling a source of an electrical potential to said layer of conductive material.

3. The invention of claim 1 further including the step of applying a voltage to effect a change in thickness of said layer of piezoelectric material in accordance with the relation: $\Delta T = V^* d_{33}$, where T is thickness, V is voltage and d is a piezoelectric property for a material.

4. The invention of claim 1 wherein the step of applying energy includes the step of using an AC voltage to cause the, color of the coating to fluctuate or shift.

5. The invention of claim 1 wherein said step of coating a layer of piezoelectric material on said surface is effected using sol-gel deposition.

6. The invention of claim 1 wherein said step of coating a layer of piezoelectric material on said surface is effected using sputter deposition.

7. The invention of claim 1 wherein said step of coating a layer of electrically conductive material on said layer of piezoelectric material is effected using sputter deposition.

8. The invention of claim 1 wherein said piezoelectric material exists in a wet state prior to said coating step and exists in a dry state after said coating step.

9. The invention of claim 1 wherein said layer of electrically conductive material exists in a wet state prior to said coating step and exists in a dry state after said coating step.

* * * * *

UNITED STATES PATENT AND TRADEMARK OFFICE
CERTIFICATE OF CORRECTION

PATENT NO. : 6,878,416 B2
DATED : April 12, 2005
INVENTOR(S) : Hall

It is certified that error appears in the above-identified patent and that said Letters Patent is hereby corrected as shown below:

Column 4,
Line 33, delete "the," and insert -- the --.

Signed and Sealed this

Tenth Day of January, 2006

JON W. DUDAS
*Director of the United States Patent and Trademark Office*